United States Patent [19]

Kuhbier et al.

[11] 4,183,708
[45] Jan. 15, 1980

[54] HIGH SECURITY SYSTEMS FOR PROTECTING VALUABLE OR DANGEROUS CONSIGNMENTS FROM THEFT

[75] Inventors: Manfred Kuhbier, Düsseldorf; Sigrid Kuhbier, Rüsselsheim, both of Fed. Rep. of Germany

[73] Assignee: Ingenieurgesellschaft Kuhbier KG, Karst, Fed. Rep. of Germany

[21] Appl. No.: 887,255

[22] Filed: Mar. 16, 1978

[30] Foreign Application Priority Data

Mar. 23, 1977 [DE]  Fed. Rep. of Germany ....... 2712705

[51] Int. Cl.² .............................................. B60P 3/00
[52] U.S. Cl. .................................... 414/543; 414/352; 414/498
[58] Field of Search .................... 214/10.5 R, 38, 151, 214/75; 220/1.5, 23.4, 23.6; 294/67 DA, 67 DB; 296/35 A; 105/366 C, 366 E

[56] References Cited

U.S. PATENT DOCUMENTS

| | | | |
|---|---|---|---|
| 3,497,093 | 2/1970 | Mardiat | 214/75 R X |
| 3,507,409 | 4/1970 | Gordon | 214/38 R |
| 3,796,331 | 3/1974 | Dutton | 214/151 X |
| 3,980,185 | 9/1976 | Cain | 214/38 CA X |

FOREIGN PATENT DOCUMENTS

2301888  7/1974  Fed. Rep. of Germany .
2033659 12/1970  France .
964408   7/1964  United Kingdom .
987487   3/1965  United Kingdom .

*Primary Examiner*—Trygve M. Blix
*Assistant Examiner*—Terrance L. Siemens
*Attorney, Agent, or Firm*—Toren, McGeady and Stanger

[57] ABSTRACT

A high security transfer system for transferring valuable or dangerous consignments from a vehicle to a receiving apparatus includes an armored container for the consignment which has at least two connectors interlocked with one another so that a connector is only releasable after another connector has been fastened. The vehicle includes at least one interconnecting element which is fastened to one of the connectors on the container when the container is in the vehicle and the receiving apparatus also includes an interconnecting element. The system also includes a transfer device having an interconnecting element. The system is arranged so that to transfer the container from the vehicle to the receiving apparatus, the interconnecting element on the transfer device is fastened to one of the connectors on the container to enable the interconnection between the container and the vehicle to be released, and the transfer device then transfers the container to the receiving apparatus. The interconnecting element on the receiving apparatus is then fastened to one of the connectors on the container to enable the interconnection between the transfer device and the container to be released to complete the transfer operation.

14 Claims, 17 Drawing Figures

HIGH SECURITY SYSTEMS FOR PROTECTING VALUABLE OR DANGEROUS CONSIGNMENTS FROM THEFT

The present invention relates to a high security system for the transfer of valuable or dangerous articles, for example legal tender, secret documents, valuables or dangerous substances. At present such articles are carried in armoured and otherwise protected vehicles whilst they are transported and transferred between two secure buildings, for example banks, vaults, offices or military establishments. Usually the articles are most vulnerable whilst they are being transferred from the building to the armoured vehicle and vice versa.

The aim of such a high security system is to safeguard the articles from theft, robbery, the taking of hostages, exchange, embezzlement and unauthorised delivery. High security systems are used in the business of carrying money and items of value for, example, banks, savings banks, department stores, supermarkets, shopping centres. Such systems are also needed to protect the transport of secret documents between ministries, government offices and military installations, and for protecting the transport of confidential or secret documents or data processing material in industry, administration, insurance and for government bodies. The transport and transfer of other goods which must occur with the greatest possible security include military materials, radioactive substances, particularly products and waste, and dangerous disease-propagating substances, drugs and poisons.

At present conventional method of transporting currency and other valuables by armoured vehicle is not totally satisfactory since it requires a considerable number of personnel, and involves the greatest risk as the valuables are transferred from the vehicle to the building and vice versa. In only a few cases is it possible for the transporting vehicles to drive directly up to a building, for example a bank, with only a small gap between the doors of the vehicle and the entrance. In any case it would be necessary to drive on the pavement and interfere with pedestrian traffic and frequently the chain link pedestrian barriers on edges of the pavements at corners of roads or parking meters or other obstructions make it impossible for the vehicle to be positioned directly against the wall of a bank building. Furthermore, the access of conventional security vans is often hampered by parked vehicles which make it necessary for the money and other valuables to be carried over a fairly long distance. If in addition there are no parking places for the vehicle available in the immediate vicinity of, for example, the entrance to a bank building, then the money or other valuables will have to be carried over an even greater distance and this results in an even greater risk and danger of the valuables being attacked. Finally, thefts can occur from the armoured vehicle and there is also a risk of intended or unintentional exchange of the containers holding the valuables.

German Offenlegungsschrift No. 23 01 888 discloses a high security system for the transport and transfer of legal tender, valuable objects, or dangerous substances which are carried in armoured or otherwise protected vehicles. In the system described in this specification high strength mechanical connecting and interlocking elements are provided on a vehicle, on a transfer apparatus and on a receiving apparatus, and the system is arranged so that transfer of the legal tender, valuable objects or dangerous substances can only take place once these connections and interlocks have all been made. In the case of this known system, the transfer apparatus consists of an armoured hollow rigid duct having a sufficiently large inside dimension that it can accommodate conveying apparatus such as rollers or a conveyor belt and a locking mechanism and still leave room for a container which passes through this hollow duct from the vehicle to the consignee's receiving apparatus. This transporting and transfer system renders unauthorised access to the containers and their valuable contents virtually impossible as the containers are transferred from the vehicle to the building, but the containers themselves are not armoured and they are not connected to the vehicle in any way. To connect the transfer apparatus to the receiving apparatus, it is necessary to have a special place at the consignee's building to receive the vehicle into a precise location with respect to the building so that the conveying apparatus can bridge the gap between the vehicle and the building, and so that the differences occur which are mentioned in the first paragraph on page 2 in the preamble to the description of this specification.

French Patent Specification No. 20 33 659 discloses a transporting and transfer system using armoured vehicles wherein currency is transported between the vehicle and the receiving apparatus by means of a pneumatic tube installation. Apart from the relatively complicated construction of this pneumatic tube installation, it allows the transport of only relatively small containers which only hold small quantities of currency. The transfer apparatus consists of flexible hoses which do not offer as much security as, for example, the armoured hollow duct mentioned in the German Offenlegungsschrift. It is also necessary for someone to stand between the vehicle and the building to connect the hoses, so that, at this time, there is opportunity for extortion and robbery to take place. This French Patent Specification No. 20 33 659 does not disclose any special mechanical connection and interlocking elements to permit transfer only when the connections have been made and the interlocking requirements satisfied.

German Utility Model Specification No. 69 26 762 is a system for the transport and transfer of currency and valuables wherein the currency or valuables are transported in armoured containers which are fixed to a vehicle by means of high strength mechanical connecting and interlocking elements. To enable these containers to be handed over to the consignee, it is necessary first to release the interlocking elements and then merely transport the container freely to the consignee, so that from the moment that the container is detached from the vehicle it may be carried off easily during the course of a robbery.

British Patent Specification No. 964 408 describes a system of transporting and transferring legal tender and valuables wherein these items have to be taken from the interior of an armoured vehicle through a lock arrangement. This lock arrangement prevents more than one container being taken from the vehicle at one time, but the container is completely insecure once it has left the vehicle and this system is just as hazardous as the system described in German Utility Model No. 69 26 762. Finally, British Patent Specification No. 987 487 discloses a transport and transfer system in which an armoured vehicle is provided with a boom moveable in three dimensions with which it is possible to transfer currency between the transport vehicle and a receiving apparatus. There is no provision for interlocking the boom and the receiving apparatus nor for any interlocking of the container holding the currency or valuables and the boom. Thus, even with this known transport and transfer system, there are loopholes in the security of the valuables during transfer and these loopholes facilitate theft.

This invention aims to provide a high security transfer system using the least number of personnel, with the maximum security against theft, the opportunity of taking hostages and unauthorised surrender and without the personnel being exposed to hazard.

According to this invention, a high security transfer system for the transfer of valuable or dangerous consignments from a vehicle to a receiving apparatus comprises an armoured container for containing the consignment and includes at least two interconnecting means which are interlocked with one another so that an interconnection with one of the means is only releasable after an interconnection has been established with another of the means, the vehicle including at least one interconnecting element which is interconnected with one of the means on the container when the container is in the vehicle, a transfer device includes an interconnecting element, and the receiving apparatus includes an interconnecting element, the arrangement being such that, in use, to transfer the container from the vehicle to the receiving apparatus, the interconnecting element on the transfer device is interconnected with one of the means on the container to enable the interconnection between the container and the vehicle to be released, the transfer device transfers the container to the receiving apparatus where the interconnecting element on the receiving apparatus is interconnected with one of the means on the container to enable the interconnection between the transfer device and the container to be released.

This system has the advantage that throughout the entire transfer process, the containers are in rigid connection with the vehicle, the transfer device or the receiving apparatus and that, for all practical purposes, it is impossible to detach the containers in the event of a robbery taking place.

The container cannot be detached from any of the interconnecting devices, even by the operator, without establishing a fresh interconnection. Thus the container cannot fall into the wrong hands unless the entire vehicle is stolen but this is very difficult because the driving cab of the vehicle is armour-plated and locked from the inside.

To establish high-strength but separable mechanical interconnection of the containers with the vehicle, the transfer device and the receiving apparatus, all the interconnecting elements are preferably formed as supporting pegs and all include a locking recess, and the interconnecting means are arranged on opposite sides of the container, each interconnecting means including a locking pin which is located inside the container and which is transversely moveable to engage the locking recess in the interconnecting elements, the interlocking arrangement between the interconnecting means including electrical, magnetic and/or mechanical sensing elements which enable the locking pins in the interlocking means on one side of the container to be released when the locking pins are inserted into the interlocking devices on the other side of the container.

This arrangement enables the containers to be transferred from the vehicle to the transfer device and from the transfer device to the receiving apparatus without any interference to the outside of the containers and thus no personnel need be exposed to any danger by handling the containers during the transfer process.

To ensure that the interconnecting means in the container will not accept rods which might possibly trigger the interlocking arrangement to enable the containers to be disconnected in an unauthorised manner and to offer an opportunity for coding particular containers and receiving apparatuses to avoid confusion and prevent the wrong containers being handed over, a further development of this invention provides for the interconnecting elements to include a portion having a predetermined cross-section which is arranged to mate only with interconnecting means having an aperture of corresponding cross-section to ensure that the interconnecting means on the container can only be interconnected with particular, matched interconnecting elements.

Preferably a lock on the lid of the container co-operates with the interlocking arrangement of the interconnecting means so that the lock locks the container lid whilst the container is interconnected with the interconnecting element associated with the vehicle or with the transfer device.

Preferably this lock associated with the interlocking arrangement is in addition to a key-operated lock on the container and, in this way, it is possible to guarantee that the containers cannot be opened during transport even if the original keys are available. The interconnecting elements include magnetic codings which actuate sensors forming part of the interconnecting means of the container to change the state of the interlocking arrangement.

Preferably the vehicle includes a number of racks mounted inside for receiving a number of containers with a corresponding number of interconnecting elements which are associated with the racks, a lock chamber through which the containers enter and leave the inside of the vehicle, the lock chamber including two doors, the outer one communicating with the outside of the vehicle and the inner one which communicates with the inside of the vehicle and which includes an interconnecting element and a stacker which is located inside the vehicle and which includes an interconnecting element, the stacker moving the containers from their racks to the inner door and the transfer device includes an extensible boom mounted on the vehicle for transferring the containers from the lock chamber to the receiving apparatus.

Alternatively the vehicle includes a number of racks mounted on the outside for receiving a number of containers with a corresponding number of interconnecting elements associated with the racks and the transfer device includes an extensible boom mounted on the vehicle for transferring the containers from their racks to the receiving apparatus.

In both cases, it is possible for the extensible boom to be actuated from outside by an operator but it is preferred that a remote control system is provided operable from the driving cab of the vehicle.

Preferably the receiving apparatus includes a lock chamber mounted in the wall of a building, the lock chamber including two doors, an outer one which communicates with the outside and an inner one which opens inwardly to communicate with the inside of the building, the inner door including an interconnecting element.

A particular example of a high security transfer system in accordance with this invention will now be described with reference to the accompanying drawings; in which.

Figures 1, 2, 3:
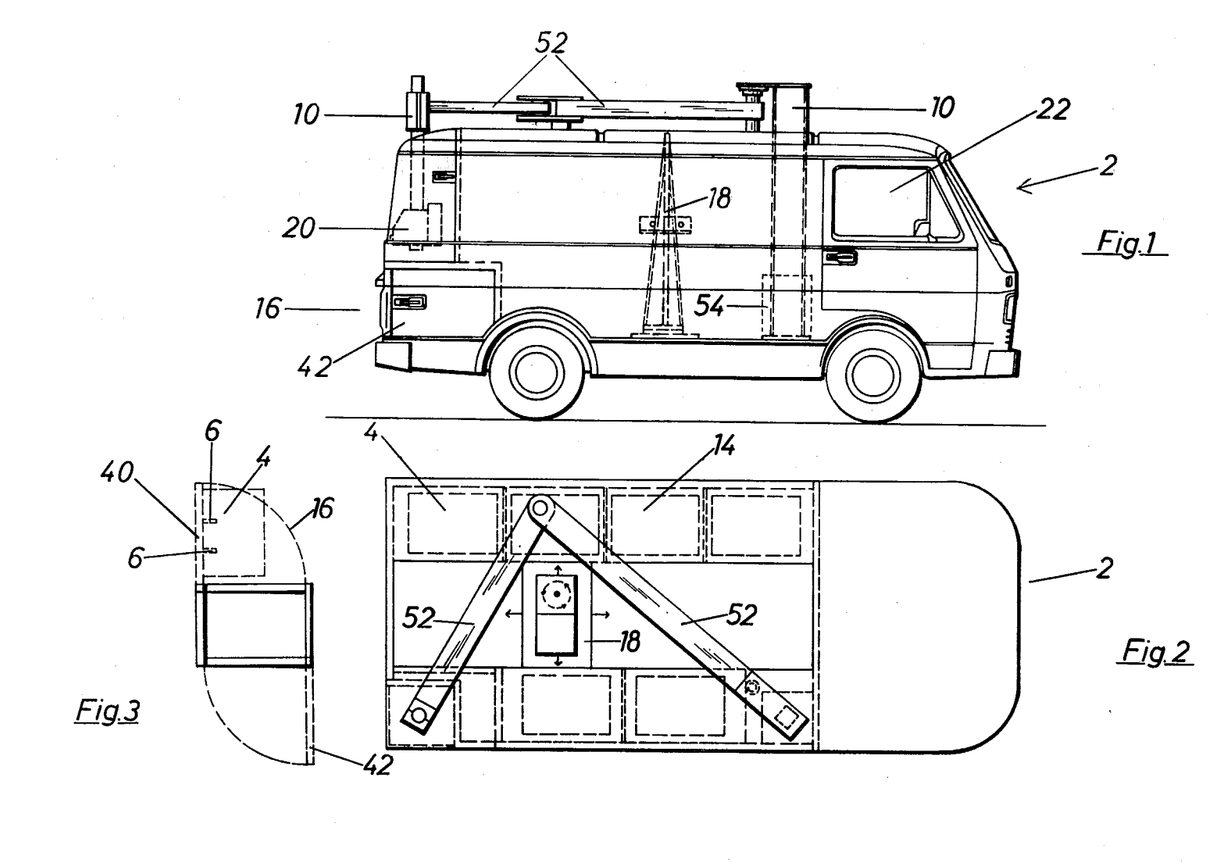
FIG. 1 is a side elevation of an armoured vehicle.
FIG. 2 is a diagrammatic plan view of the vehicle shown in FIG. 1.
FIG. 3 is a diagrammatic plan view of the lock chamber forming part of the vehicle.

FIG. 1 shows a completely enclosed armoured vehicle 2 which is arranged to accommodate a number of armoured containers 4 in its cargo space. The containers 4 are arranged in racks 14 along the side walls of the vehicle 2. Each of the containers 4 includes interconnecting means, to be described in detail later, which form connections with interconnecting elements 6 associated with each rack 14. Each container 4 includes two interconnecting means which are interlocked with one another so that the container 4 can only be released from one set of interconnecting elements 6 after a further set of interconnecting elements 6 have been connected with each container 4. In this way, each of the containers 4 in the rack 14 is firmly connected with interconnecting elements 6 whilst the container 4 is transported by the vehicle 2.

A stacker 18 is provided in the aisle between the racks 14 and this stacker 18 includes a set of interconnecting elements 6. By using the stacker 18 a container 4 can be removed from its place in the rack 14 and moved along the inside of the vehicle to be placed inside a lock chamber 16. The lock chamber 16 includes an inwardly hinged door 40 which includes interconnecting devices 6 and an outwardly opening door 42. With the outer door 42 closed and the inwardly hinged door 40 opened, the stacker 18 moves a container from its position on the rack into contact with the interlocking elements 6 on the inside of the inner door 40. The interconnection between the stacker and the container is then broken and the stacker moves away from the container 4. The inner door 40 is then closed to seal the inside of the vehicle from the lock chamber 16. The outside door 42 can then be opened to allow access to be gained to the container 4 which is connected to the interconnecting devices 6 on the inner door 40.

Figure 4:
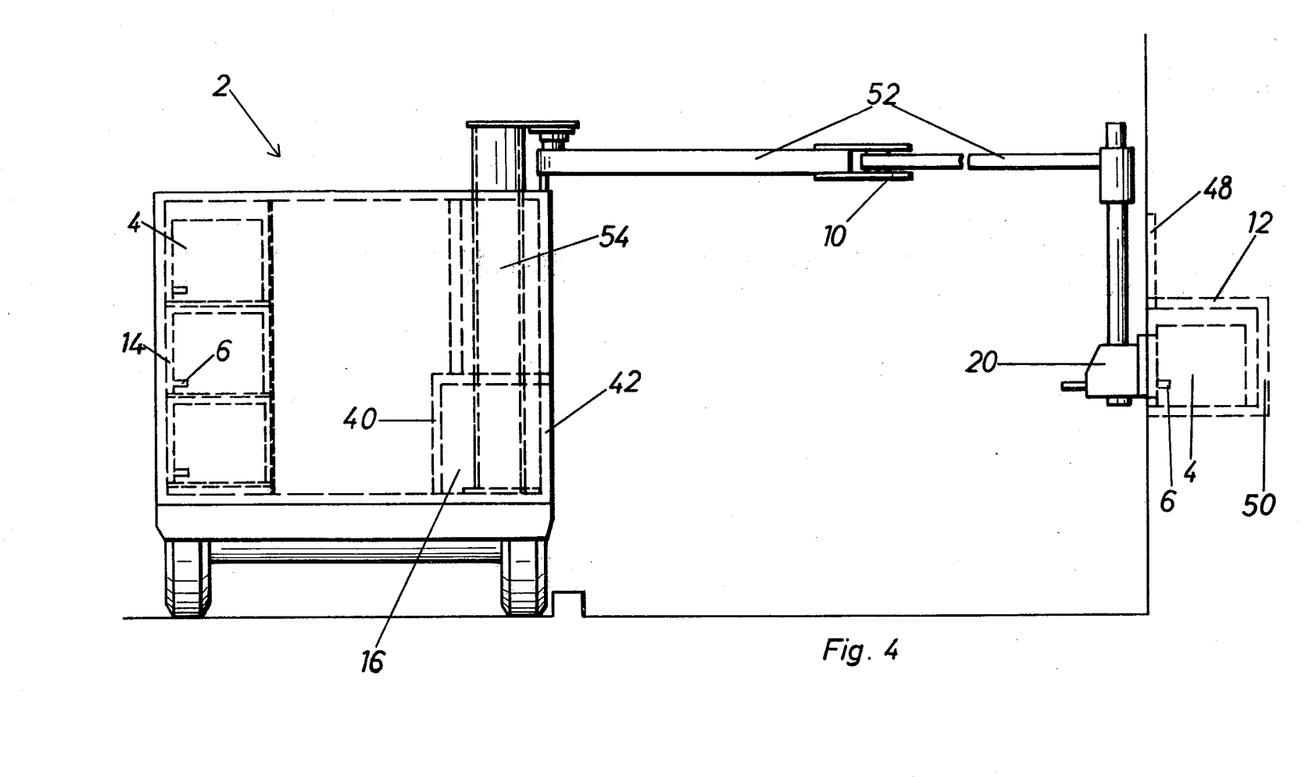
FIG. 4 is a diagrammatic rear elevation showing a container being transferred from the armoured vehicle to a receiving apparatus.

The vehicle also includes a crane 10 which has interconnecting elements 6 associated with it so that the crane 10 can be moved into engagement with the container 4 whilst it is still connected to the inner door 40 and, after the interconnecting elements 6 have been interconnected with the container 4, remove the container 4 from the lock chamber 16 and transfer it to a receiving apparatus. The receiving apparatus 12 also has the form of a lock chamber which, in this case, includes an outer sliding door 48 which can be moved up and down to allow communication to the inside of the lock chamber, and an inner door 50 which is hinged and can be opened inwardly into the inside of a bank or vault. The inner door 50 includes interconnecting elements 6 and so the crane 10 moves the container 4 into the inside of the lock chamber 12 in the receiving apparatus and engages interlocking means on the container 4 with the interlocking elements 6 on the inner door 50. The crane 10 is then disconnected from the container 4 and the outer door 48 closed to prevent access to the inside of the lock chamber 12. The inner door 50 is then hinged inwardly into the building to allow access to the container 4.

The crane 10 consists of an upright telescopic column 54 which can be raised and lowered, a horizontal boom 52 formed by two hinged arms both of which are telescopic to allow the boom 52 to bridge relatively large distances, and a depending arm 20 which can be raised or lowered with respect to the generally horizontal boom 52. The various degrees of movement of the upright column 54, the horizontal boom 52 and the depending arm 20 enable the crane 10 to lift a container 4 over any parked vehicles or any obstacle, for example a parking meter, which is located on the pavement in between the vehicle 2 and the receiving apparatus 12.

Throughout the transfer of the container 4 from the inside of the vehicle 2 to the inside of the bank or vault the container 4 is always interconnected to the vehicle or to the building. This means that it is virtually impossible to steal the container 4 during its transfer from the vehicle 2 to the building.

Figures 5, 6, 6A:
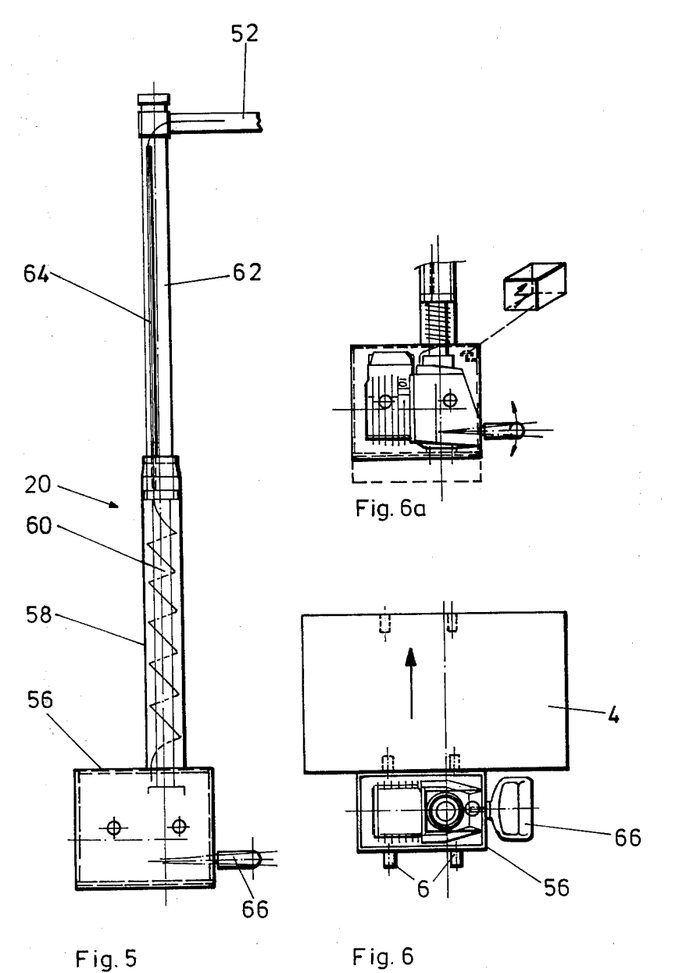
FIG. 5 is a diagrammatic elevation of part of the transfer device.
FIG. 6 is a diagrammatic plan of part of the transfer device.
FIG. 6a is a detail of the transfer device.

The type of crane 10 used with this present invention is generally known but the free end of the depending arm 20 includes an armoured housing 56 in which is located an electrically driven hydraulic pump for feeding hydraulic liquid to a double acting hydraulic piston cylinder assembly 60 and 62 to control the up and down movement of the depending arm 20. The piston 60 is enclosed by a protective tube 58 and an electrical conductor which supplies power to the hydraulic pump is located in the annular space between the piston 60 and the protective tube 58. When the electric cable reaches the barrel 62 the conductor passes through an armoured shield and consequently it is very difficult to interrupt the electrical supply to the hydraulic pump in the event of a robbery. The up and down movement of the depending arm 20 may be controlled by a control handle 66 so that an operator can govern the movement of the free end of the crane 10 but preferably the entire operation of the crane 10 is controlled from inside the driving cab 22 of the vehicle 2.

The armoured housing 56 of the crane 10 includes two sets of interlocking devices 6 on opposite sides. The interlocking devices 6 have the form of supporting pegs 6 and the two sets enable the crane to transfer a container 4 from the vehicle to the building and also transfer a container from the building to the vehicle in the same operation. To achieve this, the crane 10 is used to withdraw a container 4 from the lock chamber 16 and move it up to the lock chamber 12 in the building. The outer door 48 is then slid up and the support pegs 6 on the opposite side of the housing 56 from the container 4 are moved into engagement with interlocking means on the container 4 held by the interlocking devices 6 on the inner door 50. The crane then moves the container 4 from inside the lock chamber 12 away from the building and the depending arm is rotated through 180°. The container to be transferred from the vehicle to the building is then introduced into the lock chamber 12 and connected to the interconnecting elements 6. The interconnection between the support pegs 6 on the housing 56 and the container 4 held in the lock chamber 12 is then released to enable the crane 10 to move the container 4 to be transferred from the building to the vehicle to the lock chamber 16 on the vehicle where the container 4 is engaged with the interconnecting elements 6 on the inner door 40. The outer door 48 and the outer door 42 are then closed to complete the transfer operation.

Figures 7, 8, 9:
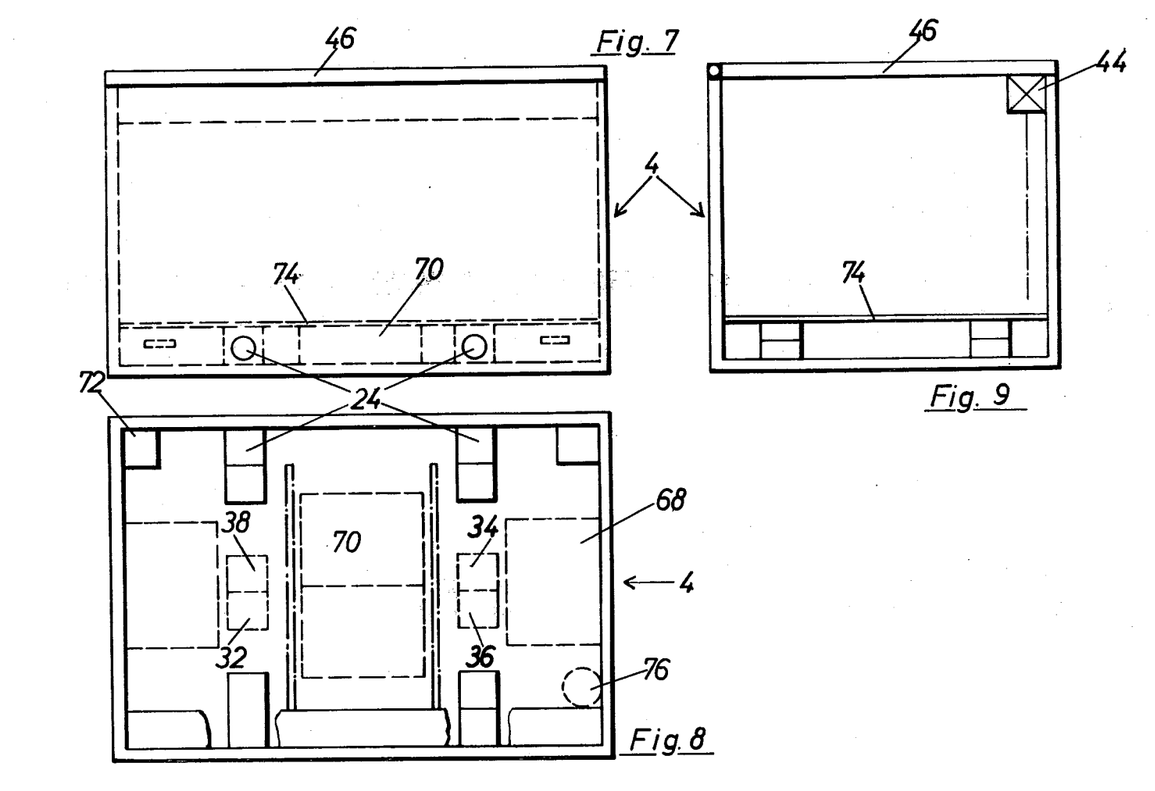
FIG. 7 is a side elevation of a container.
FIG. 8 is a plan of a container with the lid and floor removed.
FIG. 9 is an end elevation of the container.

Each of the armoured containers 4 includes a hinged lid 46 with a locking device 44, and an intermediate floor 74. The consignment is loaded in the space between the lid 46 and the intermediate floor 74 whilst the interconnecting means and various other security devices are located in the space between the intermediate floor 74 and the base of the container 4. These other security devices include a direction-finding transmitter 32, an acoustic warning system 34, a temperature sensor 36, and an infra-red or impact-sensitive sensor 38. The direction-finding transmitter 32 and/or the acoustic warning system 34 come into action if both of the interlocking means are released or, when any attempt is made to open the container in an unauthorised fashion, for example in a fashion which triggers the temperature sensor 36 or the impact sensor 38. In this way, the direction-finding transmitter makes it possible to track a stolen container 4 over considerable distances. The direction-finding transmitter, or a microphone connected to it, may also be switched on to monitor the progress of the container. Further, by suitable electronic relay circuitry always transmitting to a fixed programme, it is possible to identify one specific container.

Figures 10, 14:
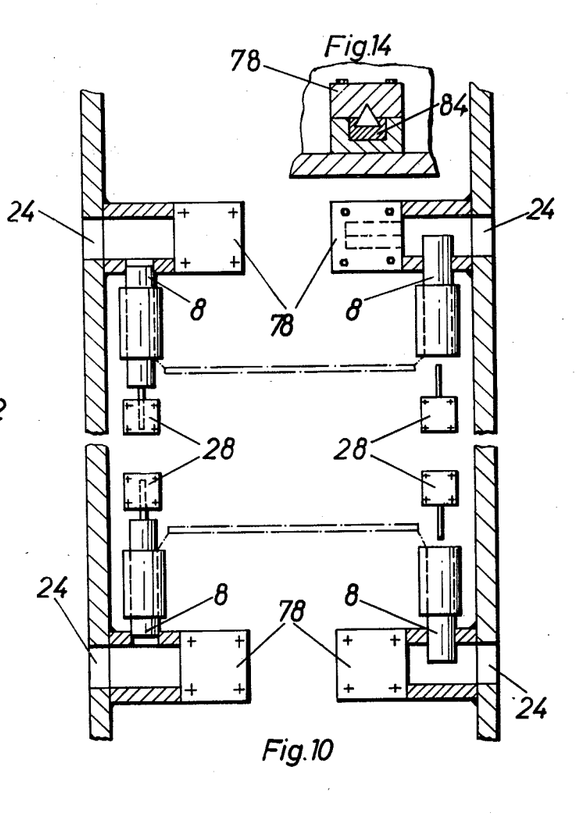
FIG. 10 is a horizontal section through the container taken in the plane of the interconnecting means.
FIG. 14 shows a profiled insert for interconnecting means to accommodate the interconnecting element shown in FIG. 13.
Figure 11:
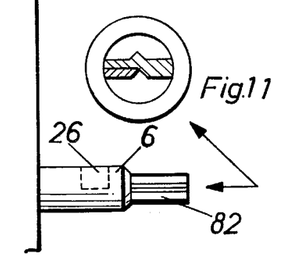
FIG. 11 shows a first example of an interconnecting element.
Figure 12:
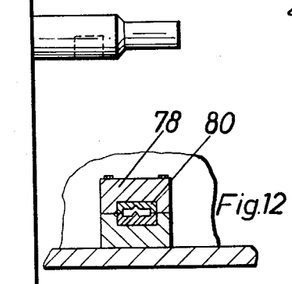
FIG. 12 shows a profiled insert for interconnecting means to accommodate the interconnecting element shown in FIG. 11.
Figure 13:
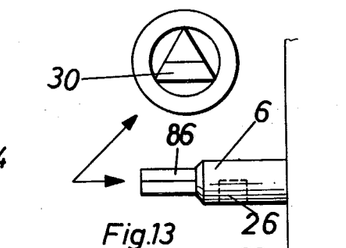
FIG. 13 shows a second example of an interconnecting element.
Figure 15:
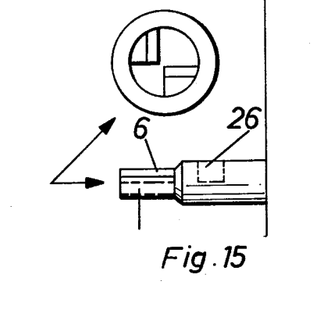
FIG. 15 shows a third example of an interconnecting element.
Figure 16:
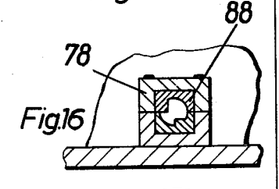
FIG. 16 shows a profiled insert for interconnecting means to accommodate the interconnecting element shown in FIG. 15.

The interconnecting means on each container 4 includes two sets of apertures 24 located on opposite sides of the container 4 and a locking pin 8 associated with each aperture 24. The locking pins 8 are moveable transversely of the apertures 24 to engage locking recesses 26 in the interconnecting elements or supporting pegs 6 to lock the container 4 onto the interconnecting elements or supporting pegs 6. Sensing elements 28 are associated with each of the locking pins 8 and with a control device 70 for code recognition and for controlling the interlocking of the interconnecting means. The container also includes a closing system 72 for the intermediate floor 74, an accumulator 68 and a socket 76 by means of which the accumulator can be connected to a charger.

As best shown in FIG. 10, the apertures 24 include inserts 78 having particular predetermined cross-sections. The particular shape of these inserts 78 ensure that an interconnecting element or supporting peg 6 can only be inserted in the aperture 24 if it includes an end portion having a corresponding cross-section which will mate with the profiled insert 78. Three examples of differently profiled inserts are shown in FIGS. 11 to 16. In the first example, shown in FIGS. 11 and 12, the interconnecting device 6 includes a generally flat portion 82 with a V-shaped deformity along its centre which is arranged to co-operate with a correspondingly shaped insert 80. In the second example, and end portion 86 of the connecting element 6 includes a portion of triangular cross-section which co-operates with a triangularly shaped insert 84 and, in the third example, a generally rounded portion 90 with two diametrically opposed quadrant shaped grooves co-operates with a correspondingly shaped insert 88. The sensing elements 28 together with the control device 70 are arranged so that they only release the locking pins 8 associated with one pair of interconnecting means after the locking pins 8 associated with the other pair of interconnecting means have been engaged with the recesses 26 in the interconnecting elements engaged with the interconnecting means on the other side of the container. Preferably the locking pins 8 and/or the sensing elements 28 and the control device 70 also co-operate with a lock 44 on the lid 46. The lock 44 is provided in addition to a conventional key-operated lock to the lid and it is arranged to operate to hold the lid closed irrespective of the state of the conventional key-operated lock at any time that the interlocking means on either side of the container 4 is contacted by interconnecting elements 6 connected to the vehicle 2 or the crane 10. In this way, the lid 46 remains locked irrespective of the state of the conventional key-operated lock all of the time that the container 4 is outside of the premises of a bank or similar secure building.

From the foregoing, it is evident that, by using the transfer system according to the invention, it is possible so to secure transportation of money and items of value that danger is virtually out of the question. It is particularly advantageous that when using a remote control for the crane 10 no personnel need be outside of the vehicle or outside of the bank building so that there is likewise no risk to such persons. For the rest, since it is possible by using the crane to bridge relatively considerable distances with obstacles in the way, viz. parked vehicles, the transport and transfer system according to the invention is scarcely affected by the parking difficulties encountered in large conurbations.

With regard to the design of the armoured vehicle 2, deviations from the example described are entirely possible. A part of the armoured vehicle 2 may be constructed as a security chamber. Furthermore, the crane may be arranged so that it can be lowered into the roof of the vehicle and locked in this position. The lifting arm 20, which, besides being of electrohydraulic construction, may also be constructed as an electromechanical spindle transmission or a pneumatically operated transmission, can be housed in the receiving units located at the rear corners of the vehicle in order not to affect adversely the overall armouring of the vehicle 2.

In the case of vehicles in which the containers 4 are transported on motor driven roller conveyors to the lock type safe 16 without a stacker 18 being required, the container 4 is introduced into a revolving carrier provided with supporting pegs 6 and transported. If an automatic control system is used for the transfer apparatus 10, it is advantageous for the driving cab 22 to be hydraulically elevated in relation to the part at which the containers 4 are received so that the operator is at all times able to overlook the entire vehicle and the surrounding area.

In the case of banks or other institutions which have no direct access to a receiving safe, it may be necessary to undertake transportation into the building by means of a cart. The containers 4 are locked thereon in the manner already described, additional measures being taken to prevent an unauthorised carrying away of the cart together with the container 4. Such measures may for example reside in locking the wheels by an alarm system and extending or opening out heavy levers so that the cart takes up so much ground space and becomes of such a cumbersome design that it can only be carried away by means of a lorry and with the help of a lifting apparatus.

Further additional electronic and/or mechanical arrangements for safeguarding the transporting and transfer system are of course possible, the decisive feature of the present invention residing however in the constant mechanical interlocking of the containers on the vehicle 2, the transfer device 10 and the receiving apparatus 12 during the process of transference.

In the case of military equipment and dangerous substances, the transport and transfer system is provided with constant mechanical locking on the vehicle or transfer means and is supplemented by a system in which the containers 4 are stored together with their contents in a constant mechanical interlock.

In the past, where dangerous substances were supplied only in correspondingly secured but freely transportable containers, theft, unauthorised taking etc., depended only upon the security of the relevant building, premises or storage cabinets, etc.

The system of constant mechanical interlock on the storage equipment ensures that even after removal of the building security, these containers cannot be removed from the store. Similarly, there is no possibility of unauthorised withdrawal from the containers, since the lid of the containers inside the storage equipment is secured by the interlocking system. Withdrawal from or filling of containers is thus possible only in rooms which are specially protected.

In particular in the case of intermediate storing of radio-active waste which has to be processed, the constant mechanical interlocking system on storage installations has eliminated the risk of theft or exchange of containers.

We claim:

1. In a high security transfer system for protecting consignments from theft during their transfer from a vehicle to a receiving apparatus, the improvement comprising an armoured container for containing said consignment, said armoured container including at least two interconnecting means, and interlocking means interlocking said interconnecting means whereby an interconnection with one of said interlocking means is only releasable after an interconnection has been established with another of said interlocking means, said vehicle including at least one interconnecting element, said interconnecting element on said vehicle being interconnected with one of said interlocking means on said container when said container is in said vehicle, a transfer device including an interconnecting element, and said receiving apparatus also including an interconnecting element, whereby to transfer said armoured container from said vehicle to said receiving apparatus, said interconnecting element on said transfer device is interconnected with one of said interconnecting means on said container to enable said interconnection between said container and said vehicle to be released, said transfer device transferring said container to said receiving apparatus where said interconnecting element on said receiving apparatus is interconnected with one of said interconnecting means on said container to enable said interconnection between said transfer device and said container to be released.

2. The transfer system of claim 1, wherein said receiving apparatus includes a lock chamber located in a wall of a receiving building, said lock chamber including an inner door and an outer door, said outer door communicates said chamber with outside, said inner door communicates said chamber with inside said building, said inner door including an interconnecting element.

3. The transfer system of claim 1, wherein said receiving apparatus is arranged to store said containers complete with their consignments and wherein said receiving apparatus includes a plurality of racks to receive said containers and includes and corresponding plurality of interconnecting devices, whereby said containers are permanently connected to said interconnecting devices during storage.

4. The transfer system according to claim 1, characterised by the system for constant mechanical interlocking of containers, of which the size, shape and dimensions are adapted to whatever objects have to be transported or stored, the containers being locked by supporting pegs on racks as well as sheds or buildings provided with supporting pegs, particularly for the safeguarding of military equipment, radio-active products and waste as well as other dangerous substances.

5. The system of claim 1, characterised by the securing of a container by insertion into a guide carriage equipped with supporting pegs and permitting conveying at right angles within a vehicle safe which is provided with motor driven roller conveyors and which has only one outside door for insertion of and withdrawal of containers by means of transfer apparatus.

6. The transfer system of claim 1, wherein said vehicle further includes a plurality of racks, said racks being located inside said vehicle, for receiving a plurality of said containers, a plurality of said interconnecting elements corresponding to the number of racks, one of said interconnecting elements being associated with each of said racks, a lock chamber through which said containers enter and leave said vehicle, said lock chamber havng an inner door and an outer door, said outer door communicating with the outside of said vehicle and said inner door communicating with said vehicle inside, said inner door being equipped with a further interconnecting element, and a stacker located inside said vehicle, said stacker including an interconnecting element and said stacker moving said containers from said racks to said inner door, and wherein said transfer device forms part of said vehicle and includes an extensible boom for transferring said containers from said lock chamber to said receiving apparatus.

7. The transfer system of claim 6, wherein said extensible boom includes a remote control facility operable from inside said vehicle.

8. The transfer system of claim 1, wherein said vehicle includes a plurality of racks, said racks being located on the outside of said vehicle for receiving a plurality of said containers, a plurality of interconnecting elements corresponding to the number of racks, one of said interconnecting element being associated with each of said racks, and wherein said transfer device forms part of said vehicle and includes an extensible boom for transferring said containers from their respective racks to said receiving apparatus.

9. The transfer system of claim 8, wherein said extensible boom includes a remote control facility operable from inside said vehicle.

10. The transfer system of claim 1, wherein said interconnecting elements are all formed as supporting pegs and all of said interconnecting elements include locking recesses, and wherein said interconnecting means are arranged on opposite sides of said armoured container, each of said interconnecting means including a locking pin, said locking pins being located inside said armoured container and said locking pins being transversely moveable to engage said locking recesses in said interconnecting elements, said interlocking means including one of electrical, magnetic, and mechanical sensing elements to enable said locking pins in said interconnecting means on one side of said armoured container to be released when said locking pins are inserted into said interconnecting means on the other side of said armoured container.

11. The transfer system of claim 10, wherein said interconnecting elements include a portion having a predetermined cross-section, and said interconnecting means on said container include an aperture of corresponding cross-section to allow only said interconnecting elements having said predetermined cross-section to be connected with said interconnecting means.

12. The transfer system of claim 10, wherein said interconnecting elements include magnetic codings and said interconnecting means include sensors responsive to said magnetic codings to change the state of said interlocking means.

13. The transfer system of claim 10, wherein said container includes lock means, said lock means cooperating with said interlocking means whereby said lock means locks said container whilst said container is interconnected with said interconnecting elements associated with said vehicle and with said transfer device.

14. The transfer system of claim 13, wherein said interconnecting elements include magnetic codings and said interconnecting means include sensors responsive to said magnetic codings to change the state of said interlocking means.

* * * * *